No. 773,877. PATENTED NOV. 1, 1904.
P. LORILLARD.
APPARATUS FOR COMPACTING FINELY DIVIDED MATERIALS.
APPLICATION FILED JUNE 23, 1903.
NO MODEL.
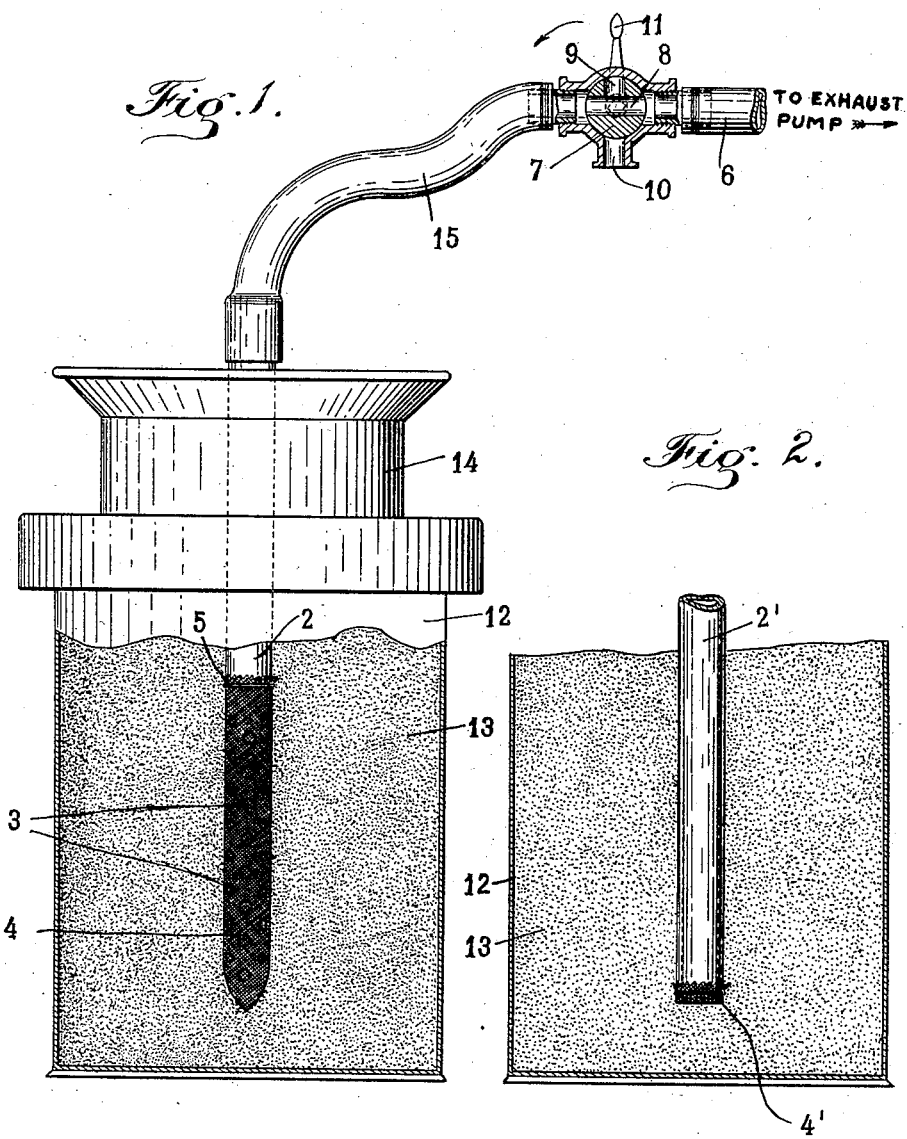
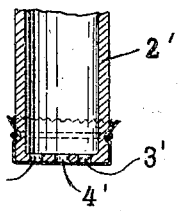
Witnesses:
Arthur F. Randall
Joseph F. Brennan
Inventor:
Pierre Lorillard,
By E. D. Chadwick,
Attorney.

No. 773,877. Patented November 1, 1904.

UNITED STATES PATENT OFFICE.

PIERRE LORILLARD, OF TUXEDO PARK, NEW YORK, ASSIGNOR TO AUTOMATIC WEIGHING MACHINE COMPANY, OF NEW YORK, N. Y., A CORPORATION OF NEW YORK.

APPARATUS FOR COMPACTING FINELY-DIVIDED MATERIALS.

SPECIFICATION forming part of Letters Patent No. 773,877, dated November 1, 1904.

Application filed June 23, 1903. Serial No. 162,820. (No model.)

*To all whom it may concern:*

Be it known that I, PIERRE LORILLARD, a citizen of the United States, residing at Tuxedo Park, in the county of Orange and State of New York, have invented new and useful Improvements in Apparatus for Compacting Finely-Divided Materials, of which the following is a specification.

This invention is an apparatus for settling or compacting masses of finely-divided material, and particularly fine and dry powders, in accordance with a method described and claimed in another application for Letters Patent, filed by me on the 23d day of June, 1903, Serial No. 162,819, said method consisting, broadly speaking, in subjecting a given mass of material to the simultaneous action of a compressing force and of a diminished air-pressure so produced and applied to the mass that the air with which it is charged, or a sufficient portion thereof, is caused to expand and escape therefrom, leaving the particles of material behind it.

My invention is illustrated in the accompanying drawings, in which—

Figure 1 represents in side elevation a preferred form of my apparatus in position to operate upon a quantity of material contained in a receptacle and "riser," a portion of the receptacle and its contents being shown in vertical section. Fig. 2 is a similar view showing a modification. Figs. 3 and 4 are respectively a central longitudinal section and a bottom plan view of the lower end of the apparatus shown in Fig. 2.

The apparatus illustrated in Fig. 1 of the drawings comprises a tube 2, adapted to be inserted at one end into a receptacle containing material to be compacted and provided at or near this end with one or more openings, preferably consisting of perforations 3, formed in the walls of the tube. The perforated portion of the tube is covered with a strainer, which thus serves to separate the interior from the exterior of the tube and is of such fineness that it will permit air to pass through it, but will be impervious to particles of the material to be operated upon, or substantially so. For fine and dry powders, such as baking-powder and the like, this strainer preferably consists of a hood or sheath 4, made of thin fabric, such as bolting-cloth, and tightly secured to the tube 2, as at 5. The tube thus provides a rigid backing and support for the strainer, and I have found that under conditions of use such as are herein described such a strainer is pervious to air, but is impervious to most fine powders. The other end of the tube 2 is connected to a pipe 6, which leads to an air-pump (not shown) or other suitable device for exhausting air from it and the tube 2. The withdrawal of air from the tube may be controlled in any suitable manner, a convenient device for the purpose being the two-way valve 7 illustrated in the drawings, which is provided with a passage 8, arranged to establish communication between the tube 2 and the pipe 6 when the valve is in the position shown and with a supplementary passage 9, arranged to establish communication between the tube 2 and an inlet 10 whenever the operating-handle 11 is turned in the direction indicated by the arrow through an angle of ninety degrees from the position shown. When the valve is in the former position, the inlet 10 will evidently be closed, and when the valve is in the latter position communication between the tube 2 and the air-pump will be cut off.

12 represents a receptacle containing a quantity of material 13, and 14 represents a riser such as is commonly employed for holding the excess material until the latter has been compacted.

In operation the strainer end of the tube 2 is inserted into the uncompacted mass of material contained in the receptacle and riser, and the valve 7 is then turned into the position shown, thus establishing communication between the tube 2 and the pipe 6. A more or less perfect vacuum is thereupon produced within the perforated lower end of the tube 2 and at the adjacent or inclosing surface of the mass of material, and by reason of this reduction of air-pressure the air with which the material is charged flows from all directions toward and into the tube through the strainer 4 and perforations 3, while at the same time the normal atmospheric pressure acting upon the exposed top surface of the mass of material through the open top of the riser exerts a compressing action upon said mass. The result is that the material is instantly compacted and settled by gravity and by the atmospheric pressure acting upon it and is forced into the receptacle 12, which is to contain it. The valve 7 is thereupon turned to cut off communication between the tube 2 and the air-pump and to establish communication between the tube and the external air, and said tube is then withdrawn from the receptacle and the contained material. The hole left in the material by withdrawing the tube may be filled by giving a slight tap or jar to the receptacle.

For the purpose of enabling the tube 2 to be conveniently inserted into and withdrawn from the receptacle it may be connected with the pipe 6 by means of a piece of flexible tubing 15.

In Figs. 2, 3, and 4 I have illustrated a modification of my apparatus, according to which the side walls of the tube 2' are not perforated, the perforations 3' being formed in the otherwise closed flat bottom of the tube. The bolting-cloth 4' covers these perforations and is secured to the tube near its lower end, as shown. This form of my apparatus may be employed with materials such as baking-powder, the particles of which are very mobile and permit the air with which the material is charged to pass readily between them for a considerable distance; but for materials of a less mobile nature I prefer the form of apparatus shown in Fig. 1, which does not require the particles of air to pass through so much of the material before they reach the strainer.

I claim as my invention—

1. An apparatus for compacting a mass of finely-divided material, comprising a tube adapted to be inserted into said mass and provided with a strainer separating its interior from its exterior, said strainer being pervious to air but substantially impervious to particles of the material operated upon, and means for withdrawing air from the interior of the tube.

2. An apparatus for compacting a mass of finely-divided material, comprising a tube provided with one or more openings, a strainer covering said openings, said strainer being pervious to air but substantially impervious to particles of the material operated upon, and means for withdrawing air from the interior of the tube.

3. An apparatus for compacting a mass of finely-divided material, comprising a tube provided with a number of perforations, a strainer covering the perforated portion of the tube and supported thereby, said strainer being pervious to air but substantially impervious to particles of the material operated upon, and means for withdrawing air from the interior of the tube.

4. In an apparatus for compacting a mass of finely-divided material, a tube adapted to be inserted into said mass and provided with one or more openings, and a strainer covering said openings, said strainer being pervious to air but substantially impervious to particles of the material operated upon.

5. In an apparatus for compacting a mass of finely-divided material, the combination of a tube adapted to be inserted into said mass, and provided with a strainer separating its interior from its exterior, said strainer being pervious to air but substantially impervious to particles of the material operated upon, and a valve controlling the flow of air into and from said tube.

6. In an apparatus for compacting a mass or finely-divided material, the combination of a pipe adapted to be connected to an air-pump, a tube provided with a strainer separating its interior from its exterior, said strainer being pervious to air but substantially impervious to particles of the material operated upon, and a hollow, flexible connection between said tube and pipe.

In testimony whereof I have hereunto subscribed my name this 17th day of June, 1903.

PIERRE LORILLARD.

Witnesses:
E. D. CHADWICK,
ROLLA W. BARTLETT.